United States Patent [19]

Kato et al.

[11] Patent Number: 4,820,668

[45] Date of Patent: * Apr. 11, 1989

[54] PROCESS FOR PREPARING POWDERED CERAMIC RAW MATERIALS OF COMPLEX OXIDE

[75] Inventors: Yoshiharu Kato; Shinsei Okabe, both of Takatsuki; Shozo Kojima, Nagaokakyo; Yasunobu Yoneda, Kyoto, all of Japan

[73] Assignee: Murata Manufacturing Co., Ltd., Japan

[*] Notice: The portion of the term of this patent subsequent to Aug. 27, 2002 has been disclaimed.

[21] Appl. No.: 852,612

[22] Filed: Apr. 16, 1986

[30] Foreign Application Priority Data

Apr. 17, 1985 [JP] Japan ................................ 60-83555

[51] Int. Cl.$^4$ ............................................. C04B 35/46
[52] U.S. Cl. .................................... 501/134; 264/56; 501/135; 501/136; 501/137
[58] Field of Search ............... 501/135, 134, 136, 137, 501/1, 138, 139, 152; 502/320; 264/56

[56] References Cited

U.S. PATENT DOCUMENTS 3,983,077  9/1976  Fuller et al. ........................ 501/137
4,537,865  8/1985  Okabe et al. ...................... 501/135
4,624,808  11/1986 Lange ..................................... 501/1

OTHER PUBLICATIONS

"Reactive Powders from Solution", D. W. Johnson and P. K. Gallagher, in *Ceramic Processing Before Firing*, Eds. Onoda and Hench, John Wiley & Sons, N.Y., 1978, pp. 134-135.

*Primary Examiner*—William R. Dixon, Jr.
*Assistant Examiner*—Andrew Griffis
*Attorney, Agent, or Firm*—Ostrolenk, Faber, Gerb & Soffen

[57] ABSTRACT

A process for preparing a powdered ceramic raw material, comprising the steps of; (a) adding gaseous carbon dioxide or a precipitant composed of a water-soluble carbonate to the first aqueous solution containing at least one nitrate or chloride of elements selected from the group consisting of Ba, Sr, Ca and Mg until the pH of the solution is reached to a predetermined value within the range of 7 to 10 to precipitate at least one carbonate of said elements, (b) adding ammonia gas or a precipitant composed of an aqueous solution of a water-soluble hydroxide to the second aqueous solution of at least one nitrate or choride of elements selected from the group consisting of Ti, Zr and Sn until the pH of the solution is reached to a predetermined value within the range of 7 to 10 to precipitate at least one hydroxide of said elements, (c) adding ammonia gas or a precipitant composed of an aqueous solution of a water-soluble hydroxide to the third aqueous solution of lead acetate or lead nitrate until the pH of the solution is reached to a predetermined value within the range of 7 to 10 to precipitate lead hydroxide, (d) mixing the carbonate precipitated from the first aqueous solution, the hydroxide precipitated from the second solution, and hydroxide precipitated from the third aqueous solution; and (e) treating the resultant mixture with heat to form complex oxides of said elements.

10 Claims, No Drawings

PROCESS FOR PREPARING POWDERED CERAMIC RAW MATERIALS OF COMPLEX OXIDE

FIELD OF THE INVENTION

This invention relates to a process for preparing powdered ceramic raw materials of complex oxide with a fine grain size.

With increasing demand for smaller-sized electronic devices, efforts are being made to decrease the size of electronic components to be incorporated in such devices. For ceramic capacitors, efforts have been made to develop dielectric ceramics with a high dielectric constant. In the present stage of the related art technology, however, it is impossible to achieve a considerable increase in dielectric constant. Thus, the most practical approach to decrease the size of ceramic capacitors is to decrease a thickness of ceramic body. However, the decrease in the thickness alone causes an increase in a dielectric loss and increase in variation of capacitance with change in an applied DC or AC biasing voltage. In particular, if the ceramic bodies with a large crystal grain size, for example, of the order of 8 $\mu$m are used for capacitors, relatively large pores (some as large as 20 $\mu$m) are present at grain boundaries and cause a lowering in the breakdown voltage of the capacitor.

Thus, in order to decrease the thickness of ceramic capacitors with no deterioration in performance, it is required to use a cermic body with a fine grain size. If the crystal grain size can be reduced, the pores on grain boundaries can be reduced in size, thus making it possible to improve the breakdown voltage of the capacitor. In this case, if it is possible to reduce the grain size to a value close to 0.6 $\mu$m which is a thickness of the 90° domain wall, it would be possible to avoid the transformation from the cubic to tetragonal crystal structure which occurs when the temperature of the sintered ceramic body is lowered from an elevated temperature after sintering. This makes it possible to prevent the capacitors from a lowering in capacitance that takes place with elapse of time (Hereinafter, the change in capacitance that takes place with elapse of time is defined as an aging characteristic). As a further advantage, the ratio of the c-axis to a-axis of the ceramic crystal approaches 1.00 to reduce the change in capacitance resulting from variations in DC or AC bias. An additional advantage is that a mechanical strength may be improved.

Conventionally, powdered ceramic raw materials are prepared by the solid-phase reaction technique using dried starting raw materials such $BaCO_3$, $CaCO_3$, $SrCO_3$, $TiO_2$, $ZrO_2$ and $SnO_2$. Two basic processes have been used for preparing ceramic raw materials. The essentials of one process are first to prepare powders of $BaTiO_3$ and $CaZrO_3$ by calcination, mix them and subsequently fire them. The second process is to mix two or three raw materials such as $BaCo_3$, $CaCO_3$, $SrCO_3$, $TiO_2$ and $ZnO_2$ in a predetermined proportion and then calcine the resultant mixture to form a ceramic raw material.

However, both process has a serious defect that is attributable to the use of dried $BaCO_3$, $CaCO_3$, $TiO_2$ and $ZrO_2$ as starting raw materials. These starting materials are generally made by precipitating respective components in the form of fine colloidal particles, filtering, and drying (and then calcining, if necessary) the precipitate. During the drying and subsequent calcining steps, the particles of each component agglomerate to form secondary particles with a size ranging from 0.5 to 2 $\mu$m. Once primary particles are agglomerated, they cannot be milled into particles with a size of less than 1 $\mu$m. If such raw materials are used for production of ceramic bodies, grains grow to a size of about 8 to 20 $\mu$m, inducing the various problems mentioned above.

Thus, in order to produce ceramic raw materials with a fine grain size, the precipitates of ceramic components produced by the liquid phase reaction must be mixed in the form of fine colloidal particles. This can be realized by either the oxalate or alkoxide method. In the oxalate method, ions of ceramic components, for example, Ti and Ba ions, are reacted with oxalic acid to precipitate barium titanyl oxalate, $[BaTiO(C_2O_4)]$, and the precipitate is thermally decomposed at a temperature of 700 °C. to form $BaTiO_3$.

While this method makes it possible to prepare fine particles with fairly satisfactory results, no elements other than Ba and Ti can be precipitated. It is therefore impossible with the oxalate method to produce multi-component ceramics which are most widely used in industry. Another disadvantage that makes the oxalate method unsuitable for practical purposes is the high cost of the oxalate formed.

The alkoxide method involves difficulty in preparing alkoxides of various metals, and the alkoxides that could be obtained are very expensive. Another factor that reduces the commercial value of this method is the use or organic solvents because protection must be provided against explosion of solvent vapor.

Further, during sintering of compact, grain growth may occur and grains grow to a size of about 1 and 2 $\mu$m since the raw materials prepared by the oxalate or alkoxide method contain no crystal growth inhibitor. Since the products of these methods are not secondary particles but fine primary particles, a large amount of binder must be used to granulate them. Thus, on further sintering of compact, a considerable shrinkage may occur, thus making it impossible to produce desired ceramic products.

In order to prepare a ceramic raw material with a fine grain size, it is therefore required to satisfy the following conditions:

(1) to precipitate all the components for a composite system by a liquid phase reaction to form colloidal primary particles;

(2) to mix the colloidal primary particles of each component in solution to prevent them from agglomeration;

(3) to granulate the fine primary particles before compacting into secondary particles to reduce the amount of a binder to be used;

(4) to prevent the particles from grain growth during sintering; and, (5) to produce a desired ceramic raw material safely and at low cost.

However, none of the conventional processes can satisfy all the requirements mentioned above at the same time.

Recently, there have been proposed a variety of processes which include the steps of preliminary adding an alkali to a solution containing ceramic elements such as Pb, Zr, Ti or La, before forming precipitates of the ceramic components. These process are summarized as follows.

(1) A process comprising the steps of adding alkali to a lead solution to form precipitate of lead, adding a solution containing other components such as Zr, Ti and La to the solution of lead, and then adding alkali to the resultant mixture.

(2) A process comprising the steps of adding alkali to a lead solution to form its precipitate, adding an excess amount of alkali, and then adding a solution containing other components such as Zr, Ti and La to the solution of lead;

(3) A process comprising the steps of adding alkali to a solution containing nitrates of chlorides of ceramic components such as Zr, Ti and La to form their precipitates, adding a solution containing lead to the solution, and then adding alkali to the resultant mixture;

(4) A process comprising the steps of adding alkali to a solution containing nitrates or chlorides of ceramic components such as Zr, Ti and La to form their precipitates, adding an excess amount of alkali to the above solution, and then adding a solution containing lead to the resultant mixture;

(5) A process comprising the steps of adding alkali to a solution containing nitrates or chlorides of ceramic components such as Pb, Zr and La to form their precipitates, adding a solution containing Ti to the solution, and then adding alkali to the resultant mixture; and, (6) A process comprising the steps of adding alkali to a solution containing nitrates or chlorides or ceramic components such as Pb, Zr and La to form their precipitates, adding an excess amount of alkali, and then adding a solution containing $TiCl_4$ to the resultant solution.

In these processes, it is impossible to avoid formation of a precipitate of $PbCl_2$ or $Pb(OH)_2 \cdot PbCl_2$ in the final mixed solution. For example, in the processes of (1) and (5), lead is firstly precipitated as $Pb(OH)_2$, which is then dissolved and precipitated as $PbCl_2$ by the addition of a solution of $TiCl_2$ since the solution is made acidic with $TiCl_2$. In the processes (2) and (6), the precipitate of $Pb(OH)_2$ is dissolved when an excess amount of alkali such as NaOH, and is reprecipitated in the form of $PbCl_2$. This phenomenon may be avoided by dilution with water, but it is impossible to put it into practical use since it requires a large amount of water. In the process (3), precipitation pf $PbCl_2$ and $Pb(OH)_2 \cdot PbCl_2$ occurs when a solution containing Pb is added to the solution containing precipitates of Zr, Ti and La since it contains alkali in an amount required for the precipitates of Ti, Zr and La. In the processes (3) and (4), Pb reacts with NaCl and $NH_4Cl$ to form $PbCl_2$ when the solution containing Pb is added to the solution containing precipitate of Ti(OH).

If the precipitates containing $PbCl_2$ is used as a raw material, $PbCl_2$ is evaporated from the compacts during calcining and subsequent sintering, resulting in change in molar ratio of Pb in ceramic bodies.

It is therefore an object of the present invention to provide a process for preparing a powdered ceramic raw material with fine grain size which overcomes the aforesaid disadvantages and makes it possible to manufacture smallersized ceramic capacitors with a large capacitance.

SUMMARY OF THE INVENTION

According to the present invention, there is provided a process for preparing a powdered ceramic raw material composed of complex oxides, comprising the steps of;

(a) adding gaseous carbon dioxide or a precipitant composed of a water-soluble carbonate to a first aqueous solution containing at least one water-soluble salt of elements capable of being precipitated as a carbonate until the pH of the resulting mixture reaches to a predetermined value within the range 7 to 10 to precipitate at least one carbonate of said elements, (b) adding ammonia gas or a precipitant composed of an aqueous solution of a water-soluble hydroxide to a second aqueous solution containing at least one water-soluble salt of elements capable of being precipitated as a hydroxide until the pH of the solution reaches to a predetermined value within the range of 7 to 10 to precipitate at least one hydroxide of said elements, (c) adding ammonia gas or a precipitant composed of an aqueous solution of a water-soluble hydroxide to a third aqueous solution containing lead acetate or lead nitrate until the pH of the solution reaches to a predetermined value within the range of 7 to 10 to precipitate lead hydroxide, (d) mixing slurries of the carbonate precipitated from the first aqueous solution, the hydroxide precipitated from the second solution, and hydroxide prcipitated from the third aqueous solution, followed by filtration, washing with water and drying; and (e) treating the resultant mixture with heat to form complex oxides of said elements.

As water-soluble salts to be contained in the first aqueous solution, there may be used those such as nitrates or chlorides of elements selected from the group consisting of Ba, Sr, Ca and Mg. As water-soluble salts to be contained in the second aqueous solution there may be used those such as nitrates or chlorides of elements selected from the group consisting of Ti, Zr and Sn. The second aqueous solution may further contain at least one elements selected from the group consisting of Nb, Y, rare earth elements, Mn, Al, Si, Bi and Zn. The third aqueous solution may further contain manganese. In this case, it is preferred to use sodium hydroxide or potassium hydroxide as the precipitant.

More specifically, according to the present invention, there is provided a process for preparing a powdered ceramic raw material of complex oxides, comprising the steps of;

(a) adding gaseous carbon dioxide or a precipitant composed of a water-soluble carbonate to a first aqueous solution of at least one nitrate or chloride of elements selected from the group consisting of Ba, Sr, Ca and Mg until the pH of the solution reaches to a predetermined value within the range of 7 to 10 to precipitate at least one carbonate of said elements, (b) adding ammonia gas or a precipitant composed of an aqueous solution of a water-soluble hydroxide to a second aqueous solution of at least one nitrate or chloride of elements selected from the group consisting of Ti, Zr and Sn until the pH of the solution reaches to a predetermined value within the range of 7 to 10 to precipitate at least one hydroxide of said elements, (c) adding ammonia gas or a precipitant composed of an aqueous solution of a water-soluble hydroxide to a third aqueous solution of lead acetate or lead nitrate until the pH of the solution reaches to a predetermined value within the range of 7 to 10 to precipitate lead hydroxide, (d) mixing slurries of the carbonate precipitated from the first aqueous solution, the hydroxide precipitated from the third aqueous solution, followed by filtration, washing with water and drying; and (e) treating the resultant mixture with heat to form complex oxides of said elements.

In a preferred embodiment, the second aqueous solution contains one or more additives dissolved therein as an additional component of ceramic bodies to improve their electric characteristics. Preferred additives are Nb, Y, rare earth elements, Mn, Al, Si, Bi and Zn. Among them Nb, Y and rare earth elements serve as a grain growth inhibitor and contribute to inhibit grain growth during sintering. The addition of these inhibitors makes it possible to produce ceramic bodies with a grain size of not more than 1 $\mu$m.

These inhibitors also serve as a depressor which makes it possible to produce dielectric ceramics with flat temperature characteristics of dielectric constant. Among the rare earth elements, Ce and Nd are not so effective for flattening of the temperature characteristics, but effective for improvement in dielectric constant. Lanthanum (La) and niobium (Nb) are effective for flattening of the temperature characteristics of dielectric constant, and for this purpose, Nb is particularly effective. Niobium occurs as a mixture with tantalum (Ta), but tantalum as an impurity does not impair the effectiveness of Nb. Thus, a mixture of Ta and Nb may be used as the additive in the present invention.

In the above additives, the elements Mn, Al, Si, Bi and Zn serve as a mineralizer. Other elements such as Fe, Cr, Co and Cu may be used as a mineralizer in the present invention. If Si is used as a mineralizer, it is preferred to use Si in the form of a solution of water glass. This solution may be added to the precipitant to be added to the second aqueous solution.

In the foregoing process, the precipitation of lead hydroxide is carried out in the third aqueous solution separate from that of hydroxides of Ti, Zr and Sn. If a solution containing lead acetate or lead nitrate is mixed with the second aqueous solution containing, for example, $TiCl_4$ or $ZrOCl_2$, lead precipitates in the form of $PbCl_2$, thus making it impossible to obtain precipitate in the form of lead hydroxide.

When manganese (Mn) is incorporated into the second aqueous solution as a component of the ceramic, care must be taken not to use it in the presence of ammonium ions ($NH_4^+$). If the ammonium ions are present in the solution, Mn forms a complex salt, thus making it impossible to form a precipitate of manganese in the form of a hydroxide. Thus, ammonium carbonate or ammonium hydroxide should not be used as the precipitant to be added to the first or second solution when Mn is used as a component of the ceramic raw material.

DETAILED DESCRIPTION OF THE INVENTION

According to the present invention, components of the ceramics are respectively dissolved in a suitable amount of water and then poured in the first, second or third vessels in the predetermined proportions of the components to prepare the first, second and third aqueous solutions. In the first to third steps ((a), (b), and (c)), the components are respectively precipitated from the respective solutions in the form of a carbonate or hydroxide. After thorough precipitation, slurries of the precipitates are mixed.

By mixing the precipitates in the fourth step (d) there is provided a mixture composed of primary particles adjacent to one another. Individual particles have a grain size ranging from about 0.01 to 0.02 $\mu$m. In the subsequent steps, the mixture is filtered, washed with water, and then dried to provide an active raw material wherein the individual particles intermingle in a colloidal form and hence highly reactive state.

In the fifth step (e), the mixture is calcined to provide a ceramic raw material having a predetermined proportion of the components. By calcining the mixture, the individual particles are gathered in aggregates to form secondary particles. This agglomeration conributes to decrease a specific surface area ($m^2$/gr) of the particles, thus making it possible to reduce an amount of binder required for making a ceramic green sheet, which in turn contributes to decrease shrinkage of ceramic products that occurs during firing. The agglomeration of primary particles to secondary particles will do no harm to the purpose of obtaining a fine-grained ceramic product since the components are present in the secondary particles in the form of the respective primary particles. This is supported by the fact that ceramic bodies obtained by sintering the ceramic raw material have a fine grain size of about 1–2$\mu$m.

The calcination is preferably carried out at a temperature within the range of 700° to 1,200° C. If the calcination temperature is less than 700° C., the desired powder of the ceramic raw materials is not synthesized. If the temperature exceeds 1,200° C., the agglomeration to secondary particles becomes excessive.

The powder of ceramic raw material obtained by the process of the present invention is generally an oxide of $ABO_3$ type. The criteria for selecting the constituent elements used in the respective vessels are as follows: the elements used in the first vessel are such that they can be precipitated as a carbonate, and those used in the second vessel are such that they can be precipitated as a hydroxide.

In the second vessel, the pH value of the solution should be adjusted to a value within the range of 7 to 10. If the pH is outside of this range, the constituents used dissolve in the solution and fail to form a precipitate. The pH value of the first solution in the first vessel is preferably adjusted to a value equal to that of the second solution in the second vessel. If the pH of one slurry differs from that of the other, the pH value of the second solution varies with the pH of the first solution, resulting in dissolution of the hydroxide precipitated in the second vessel.

If necessary, an aqueous solution of hydrogen peroxide ($H_2O_2$) may be added to the second solution as a stabilizer to prevent the solution from hydrolysis. For example, if hydrogen peroxide is added to the solution containing Ti, Zr, Ce and Mn, they can be precipitated in the form of $Ti(PPH)(OH)_3$, $Zr(OOH)(OH)_3$, $Ce(OH)_3$, and $Mn(OH)_4$, respectively. Such precipitates have the advantage of facilitating filtration and washing operations in the subsequent steps.

An investigation on a molar ratio of A to B in the $ABO_3$ complex revealed that the crystal grain size increases and porosity appears on grain boundaries as the content of B increases. Thus, a preferred molar ratio of A to B is in the range of from 1.00:1.00 to 1:00:1.05.

According to the present invention, it is possible to produce a powdered ceramic raw material with a fine grain size and a desired proportion of constituents.

These and other objects, features and advantages of the present invention will become more apparent from the following description with reference to examples.

EXAMPLE 1

There were prepared aqueous solutions each containing a predetermined amount of a compound shown in Table I.

TABLE 1

| Compounds | Weight (g) |
| --- | --- |
| $BaCl_2 \cdot 2H_2O$ | 100 |
| $CaCl_2$ | 3.946 |
| $TiCl_4$ | 78.321 |
| $ZrOCl_2 \cdot 8H_2O$ | 1.143 |
| $SnCl_4$ | 9.237 |
| $Bi(C_2H_3O_2)_2 \cdot 3H_2O$ | 1.327 |
| $YCl_3$ | 0.359 |
| $Pb(C_2H_3O_2)_2 \cdot 3H_2O$ | 1.327 |

In the first vessel, the solutions of $BaCl_2$ and $CaCl_2$ were mixed to prepare a mixture, to which sodium carbonate ($Na_2CO_3$) was added dropwise until the pH of the mixture reached a value within the range of 7 to 10 to precipitate $BaCO_3$ and $CaCO_3$.

In the second vessel, the solutions of $TiCl_4$, $ZrOCl_2$, $SnCl_4$, $Bi(C_2H_3O_2)_2$ and $YCl_3$ were mixed to pr a mixture, to which 15 ml of 30 % hydrogen peroxide solution was added as a stabilizer. Sodium hydroxide was added to the resultant mixture until the pH of the mixture reached a value within the range of 7 to 10 to precipitate hydroxides containing Ti Zr, Sn, Bi and Y.

In the third vessel, sodium hydroxide (NaOH) was added to the solution of $Pb(C_2H_3O_2)_2$ until its pH reached a value within the range of 7 to 10 to precipitate lead hydroxide.

The slurries of the respective precipitates were mixed, filtered and then washed with water. The filter cake was milled in a ball mill, filtered off and then dried. There was obtained fine powder with a grain size of 0.02 μm.

This fine powder was calcined at 900 ° C. for 1 hour to prepare a calcined powder for dielectric ceramics.

The powder was granulated with a binder (polyvinyl alcohol) and formed into disks with a diameter of 10 mm and a thickness of 1 mm under a pressure of 1,000 $Kg/cm^2$. The disks were fired at 1260 ° C. for 2 hours to form dielectric ceramic disks. The ceramic disk has a grain size of about 0.8 to 1 μm.

Each ceramic disk was provided on its sides with silver electrodes by applying silver paste to both its sides and then baking the same at 800 ° C. for 30 minutes to prepare ceramic capacitors. For the capacitor, the dielectric constant ($\epsilon$), dielectric loss (tan $\delta$), temperature characteristics of dielectric constant (TC) and dielectric breakdown characteristic were measured. Results are shown in Table 2.

The dielectric constant and dielectric loss were measured at 1 KHz and 1 V r.m.s. The temperature characteristics of its dielectric constant (TC) were deterrmined for the temperature range of +10° C. to +85° C. on the basis of the value at +25° C.

TABLE 2

| $\epsilon$ | tan (%) | TC (%) | Breakdown Voltage (Kv/mm) |
| --- | --- | --- | --- |
| 12000 | 1.6 | +12(at +10° C.) −19(at +85° C.) | 50 |

EXAMPLE 2

There were prepared aqueous solutions each containing a predetermined amount of a compound shown in Table 3.

TABLE 3

| Compound | Weight (%) |
| --- | --- |
| $BaCl_2 \cdot 2H_2O$ | 24.320 |
| $TiCl_4$ | 77.90 |
| $NdCl_3 \cdot 6H_2O$ | 100 |
| $Bi(NO_3)_3 \cdot 5H_2O$ | 6.592 |
| $ZnCl_2$ | 3.534 |
| $Pb(C_2H_3O_2)_2 \cdot 3H_2O$ | 12.262 |

In the first vessel, an aqueous solution of $BaCl_2$ was combined with ammonium carbonate [$(NH_4)_2CO_3$] to adjust its pH to 7 to 10. $BaCO_3$ was precipitated.

In the second vessel, solutions of $TiCl_4$, $NdCl_3$, $Bi(NO_3)_3$, and $ZnCl_2$ were mixed and then combined with 15 ml of 30 % hydrogen peroxide solution as a stabilizer. The mixture was then combined with a suitable amount of ammonium hydroxide ($NH_4OH$) until its pH had taken a value of 7 to 10 to precipitate hydroxide containing Ti, Nd, Bi and Zn.

Separate from the above, the solution of $Pb(C_2H_3O_2)_2 \cdot 3H_2O$ was poured into the third vessel and then combined with ammonium hydroxide ($NH_4OH$) until its pH had taken a value of 7 to 10 to precipitate hydroxide of Pb.

Slurries of thus obtained precipitates were mixed, filtered and then washed with water. The filtered cake was milled in a ball mill, filtered and then dried. There was obtained a finely powdered ceramic raw material with grain sizes of 0.01 to 0.02 μm.

The ceramic raw material was calcined at 1000 ° C. for 1 hour to provide a calcined ceramic powder.

Using the thus prepared calcined powder, there were prepared ceramic capacitors in the same manner as in Example 1 except for that firing temperature was 1120 ° C. The electrical properties of the capacitor were measured in the same manner as in Example 1. Results are shown in Table 4.

TABLE 4

| $\epsilon$ | tan $\delta$ (%) | TC (ppm/°C.) | Breakdown Voltage (kv/mm) |
| --- | --- | --- | --- |
| 6000 | 0.01 | $+6 \times 10^{-6}$ | 190 |

What is claim is:

1. A process for preparing a powdered ceramic raw material composed of complex oxides comprising the steps of:
   (a) adding gaseous carbon dioxide or an aqueous solution of a water-soluble carbonate to a first aqueous solution containing at least nitrate or chloride of elements selected from the group consisting of Ba, Sr, Ca and Mq in a first vessel to adjust the pH of the first aqueous solution to a value within the range of 7 to 10 thereby preparing a slurry containing at least one carbonate of said elements,
   (b) adding ammonia gas or an aqueous solution of a water-soluble hydroxide to a second aqueous solution containing at least one of titanium chloride, zirconium chloride, tin chloride and tin nitrate in a second vessel to adjust the pH of the second aqueous solution to a value within the range or 7 to 10 thereby preparing a slurry of at least one hydroxide of said elements, (c) adding ammonia gas or an aqueous solution of a water-soluble hydroxide to a third aqueous solution containing lead acetate or lead nitrate to adjust the pH of the third aqueous solution to a value within the range of 7 to 10 thereby preparing a slurry containing lead hydroxide, (d) mixing the three slurries thus prepared precipitated from the first aqueous solution, the hydroxide precipitated from the second solution, and hydroxide precipitated from the third aqueous solution, filtering the mixture, washing the filter cake with water and drying; and (e) calcining the resultant mixture to form said complex oxides, at least one of said first and second aqueous solutions initially containing a chloride.

2. The process according to claim 1 wherein the second aqueous solution further contains at least one element selected from the group consisting of Nb, Y, rare earth elements, Mn, Al, Si and Zn.

3. The process according to claim 1 wherein the third aqueous solution further contains manganese and wherein the Rydroxide is sodium hydroxide or potassium hydroxide.

4. The process according to claim 1 wherein the mixture is calcined at a temperature ranging from 700 to 1200 °C.

5. The process of claim 4 wherein the second aqueous solution further contains at least one element selected from the group consisting of Nb, Y rare earth elements Mn, Al, Si and Zn.

6. The process of claim 5 wherein the third aqueous solution further contains manganese and wherein the hydroxide is sodium hydroxide or potassium hydroxide.

7. The process according to claim 1 wherein said first aqueous solution initially contains barium and calcium chlorides and said second aqueous solution initially contains titanium chloride, zinc oxychloride, tin chloride, bismuth acetate and yttrium chloride.

8. The process according to claim 7 wherein said third aqueous solution contains lead acetate, sodium carbonate is added to the first aqueous solution, and sodium hydroxide is added to the second and third aqueous solutions.

9. The process according to claim 1 wherein said first aqueous solution contains barium chloride and said second aqueous solution contains titanium chloride, nobium chloride bismuth nitrate and zinc chloride.

10. The process according to claim 9 wherein ammonium carbonate is added to said first aqueous solution, ammonium hydroxide is added to each of said second and third aqueous solutions, and said third aqueous solution contains lead acetate.

* * * * *